US009423985B2

(12) United States Patent
Niimura

(10) Patent No.: US 9,423,985 B2
(45) Date of Patent: *Aug. 23, 2016

(54) MANAGING WEB APPLICATIONS ON MULTI-FUNCTION PERIPHERALS

(71) Applicant: Kenji Niimura, Santa Clara, CA (US)

(72) Inventor: Kenji Niimura, Santa Clara, CA (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/925,511

(22) Filed: Jun. 24, 2013

(65) Prior Publication Data

US 2014/0376035 A1    Dec. 25, 2014

(51) Int. Cl.
*G06F 3/12* (2006.01)
*H04N 1/00* (2006.01)
*G06K 9/00* (2006.01)

(52) U.S. Cl.
CPC .............. *G06F 3/1203* (2013.01); *G06F 3/123* (2013.01); *G06F 3/1204* (2013.01); *G06F 3/1287* (2013.01); *G06F 3/1292* (2013.01); *H04N 1/00204* (2013.01); *H04N 1/00244* (2013.01); *H04N 1/00464* (2013.01); *H04N 1/00973* (2013.01); *H04N 2201/0075* (2013.01); *H04N 2201/0094* (2013.01); *H04N 2201/3208* (2013.01); *H04N 2201/3269* (2013.01); *H04N 2201/3273* (2013.01)

(58) Field of Classification Search
CPC ............. G06K 15/001; G06K 15/4045; G06F 3/1204; G06F 3/1292; G06F 3/1228; H04N 1/00331; H04N 1/00973; H04N 1/00408

USPC ................ 358/1.12–1.18, 3.28, 538, 426.12; 382/100; 700/235

See application file for complete search history.

(56) References Cited

U.S. PATENT DOCUMENTS

| 7,630,908 | B1* | 12/2009 | Amrien et al. ................... 705/3 |
| 8,488,142 | B2* | 7/2013 | Miyazaki et al. ............ 358/1.14 |
| 2003/0074396 | A1* | 4/2003 | Simpson ........................ 709/203 |
| 2005/0236483 | A1* | 10/2005 | Wilz et al. ............... 235/462.01 |
| 2011/0096354 | A1* | 4/2011 | Liu .............................. 358/1.15 |
| 2013/0235422 | A1* | 9/2013 | Nakata ........................ 358/1.15 |
| 2013/0342865 | A1* | 12/2013 | Shekher et al. .............. 358/1.14 |
| 2014/0253960 | A1* | 9/2014 | Neville et al. ............... 358/1.15 |
| 2014/0379913 | A1 | 12/2014 | Niimura et al. |

OTHER PUBLICATIONS

U.S. Appl. No. 13/925,50, filed Jun. 24, 2013, Office Action correct U.S. Appl. No. 13/925,520, Mar. 30, 2015.
U.S. Appl. No. 13/925,520, filed Jun. 24, 2013, Notice of Allowance, Jul. 7, 2015.

* cited by examiner

*Primary Examiner* — Gabriel Garcia
(74) *Attorney, Agent, or Firm* — Hickman Palermo Becker Bingham LLP; Edward A. Becker

(57) ABSTRACT

A MFP includes a Web application and an encoded data generator that is configured to generate encoded access data for the Web application. The encoded access data is generated based upon access data that specifies data for accessing the Web application over a network. The generation of the encoded access data may be initiated in response to installation of the Web application on the MFP, in response to a change in configuration of the MFP or the Web application, or in response to the satisfaction of other criteria. Encoded access data may also be re-generated in response to a change to the access data for a Web application, a change to the configuration of an MFP, or in response to satisfaction of other criteria. The encoded access data for the Web application may be made available to users via a user interface of the MFP, printed by the MFP on a printed medium or transmitted to a client device of a user.

17 Claims, 13 Drawing Sheets

FIG. 3
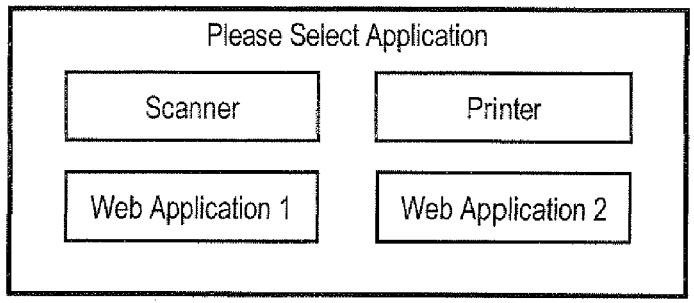
FIG. 4
Application Data Table 400
| Application Name | Application Type | Access Data |
|---|---|---|
| Scanner | Built-In | N/A |
| Printer | Built-In | N/A |
| Web Application 1 | Browser-Based | http://abc.com:80/WebApp1/index.html |
| Web Application 2 | Browser-Based | http://abc.com:80/WebApp2/index.html |
FIG. 5
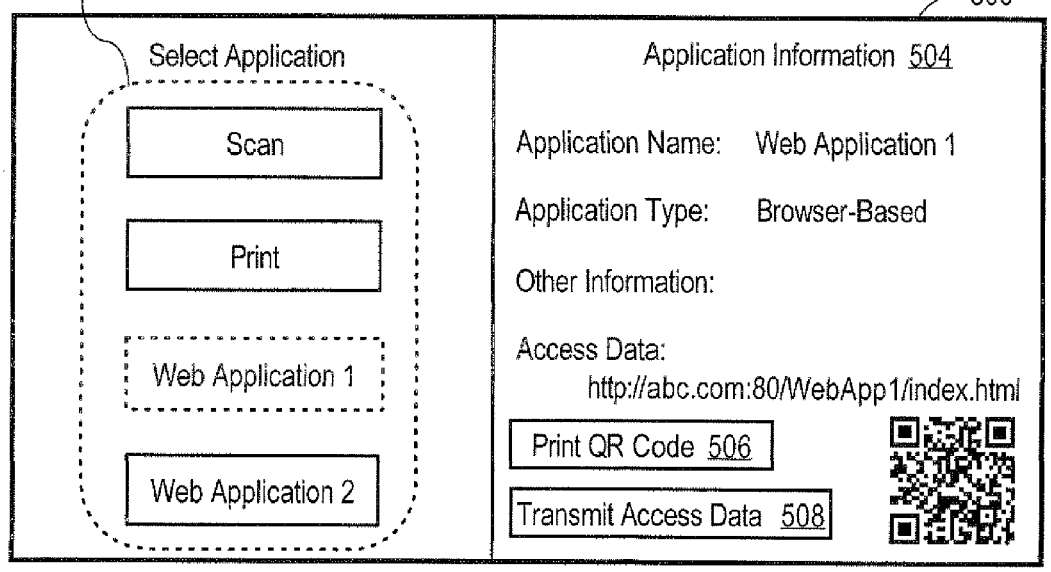

FIG. 7A

MFP Network Configuration 700

| IP Address | 123.444.11.123 | Change |
| http port | 80 | Change |
| https port | 443 | Change |

OK 706  Cancel 708

FIG. 7B

Web Application Access Data Notification 750

Select Web Application 752

- Web Application 1
- Web Application 2

Select Notification Methods 754

- ○ Print QR Code
- ○ Send Email — it-admin@abc.com, user-group1@abc.com

Change Email Recipients 756

OK 758  Cancel 760

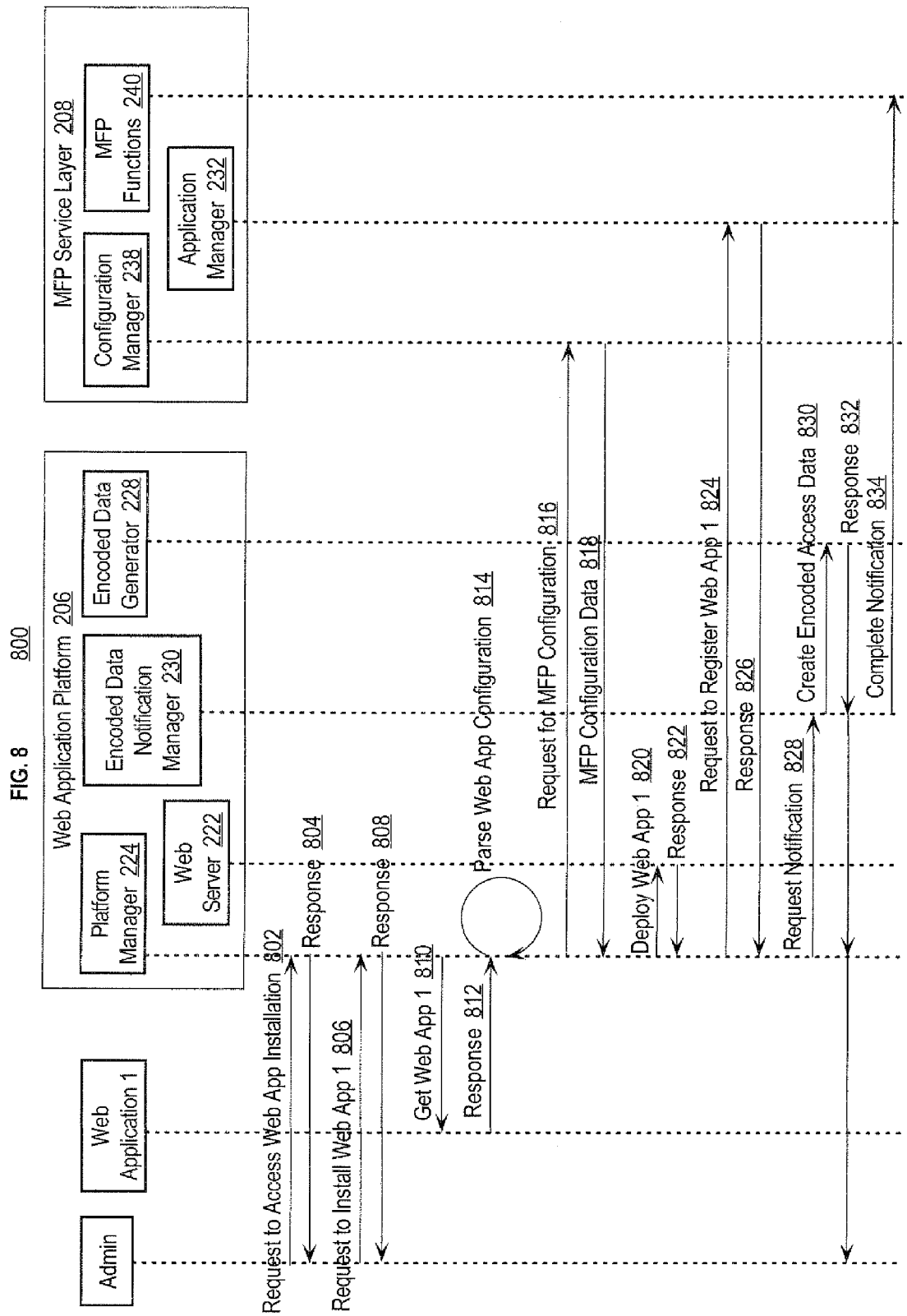

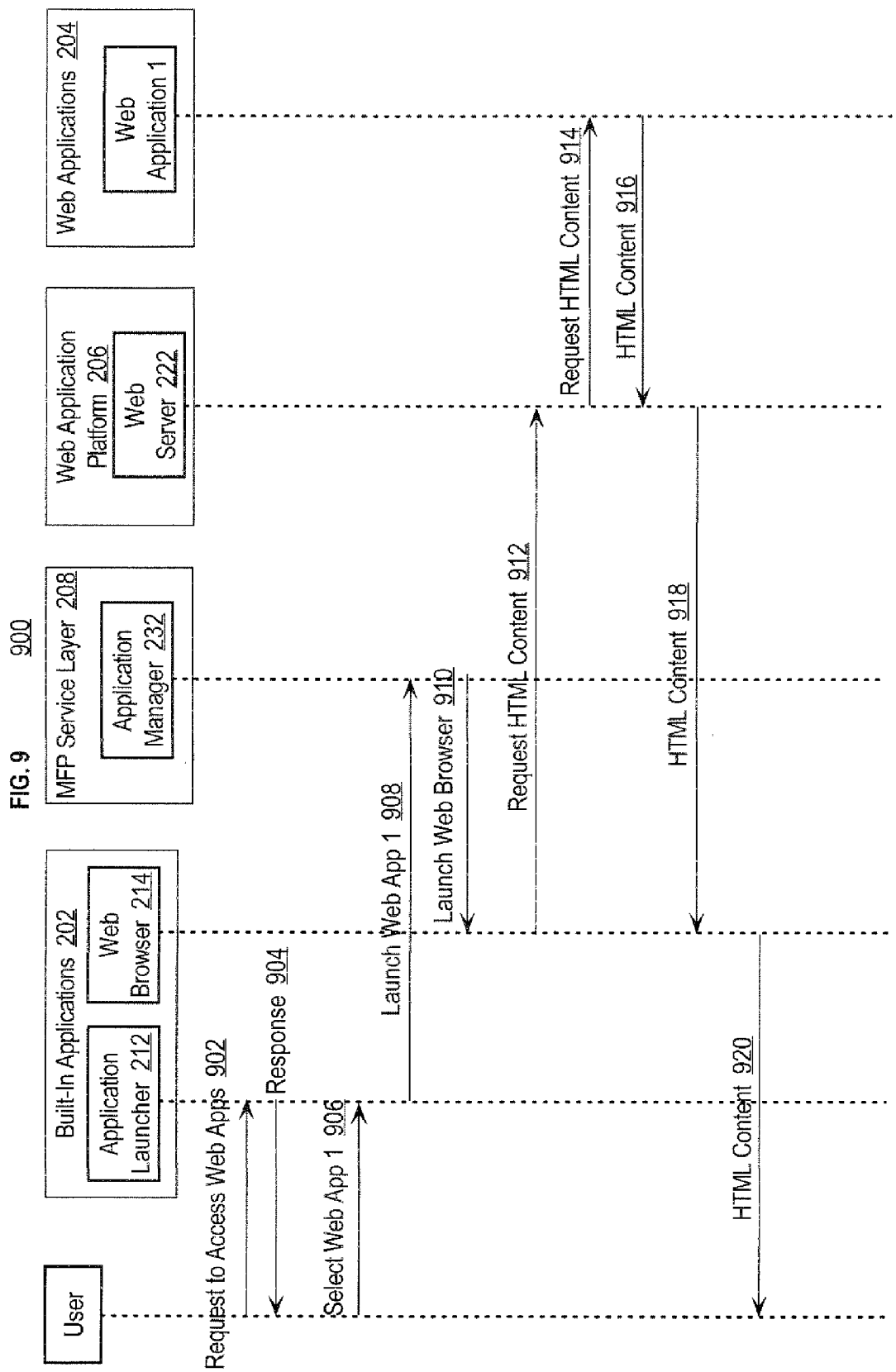

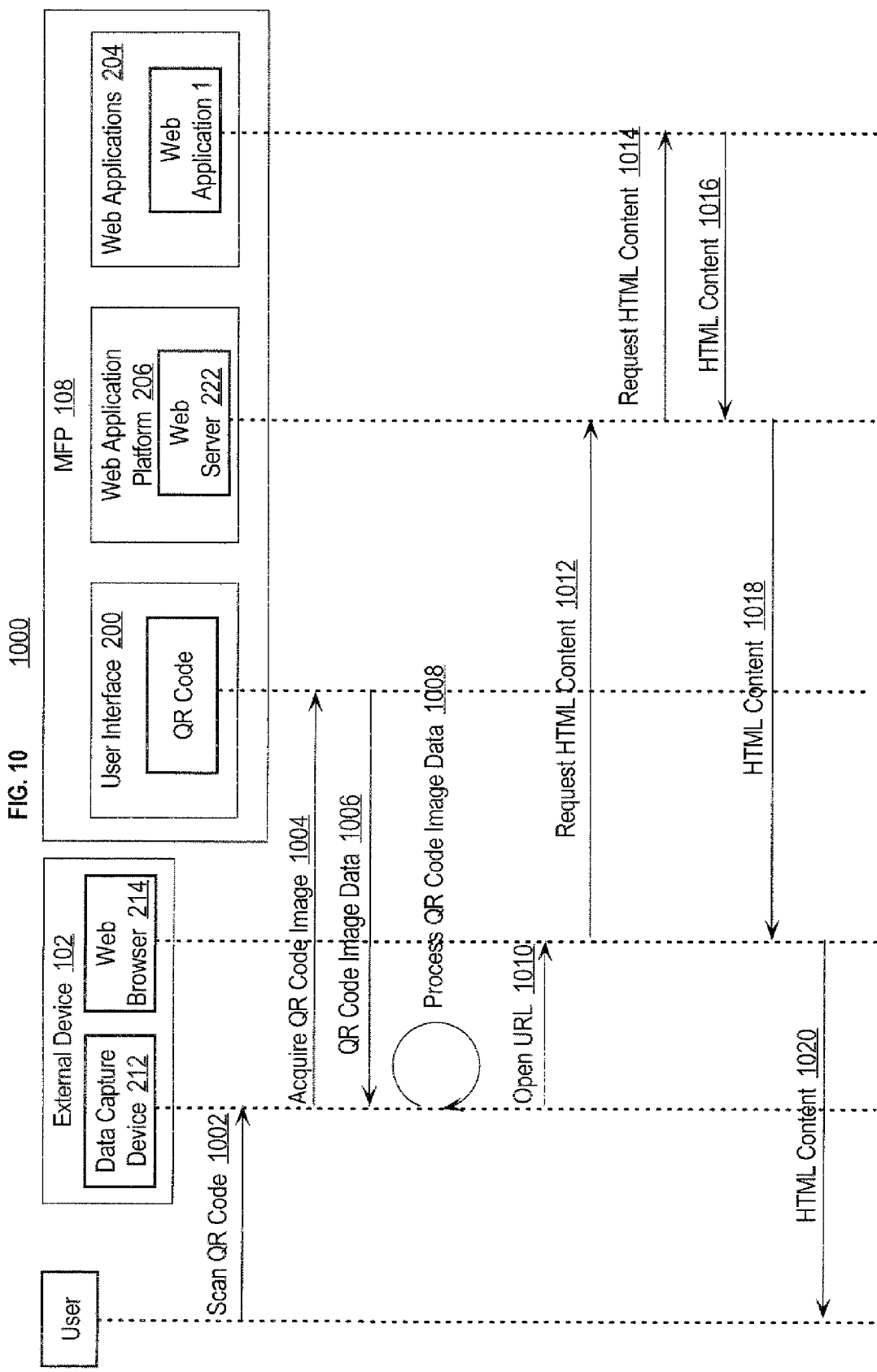

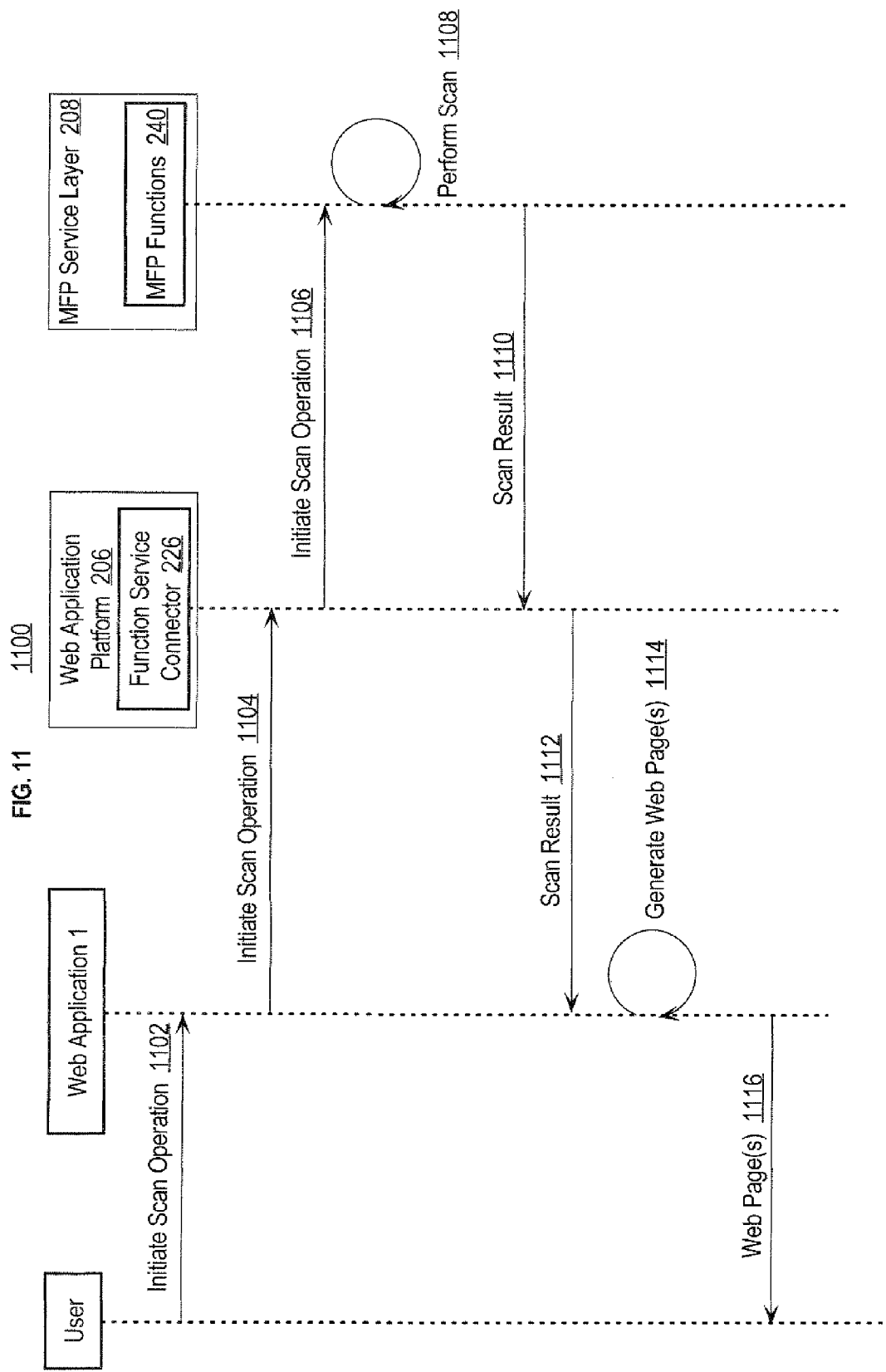

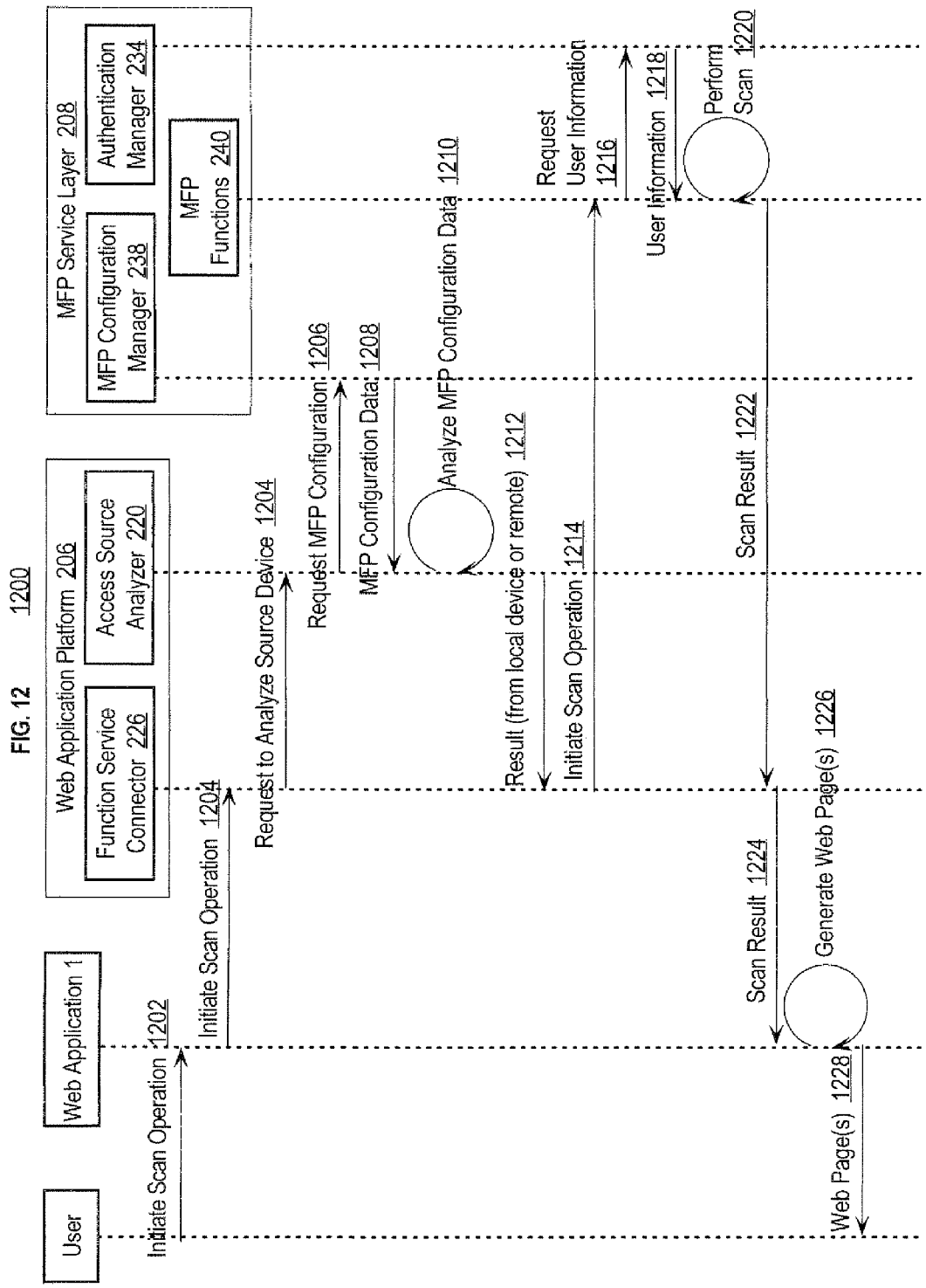

… (US 9,423,985 B2)

MANAGING WEB APPLICATIONS ON MULTI-FUNCTION PERIPHERALS

FIELD

Embodiments relate to multi-function peripherals and, more particularly, to an approach for managing Web applications on multi-function peripherals.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Some multi-function peripherals (MFPs) include sophisticated computing platforms that support built-in applications and services, such as printing, scanning, faxing, etc., Web servers and Web applications. The Web applications on an MFP can be accessed via a control panel on the MFP that invokes a Web browser executing on the MFP. Alternatively, Web applications on an MFP can be accessed via Web browsers executing on external devices, such as tablet computing devices, laptop computers, personal digital assistants (PDAs), telephony devices, such as so called "smart phones," and other mobile devices. One of the benefits of implementing Web applications on MFPs is that they can be accessed using so called "thin" clients that have minimal functionality, such as generic Web browsers.

One of the issues with MFP-based Web applications is that accessing them requires using the correct access information for a particular Web application. Access information for Web applications is typically in the form of a URL that may specify a port and/or an application name. Users of external devices may not have convenient access to the access information for Web applications on an MFP and may have to consult their IT department or information provided by a manufacturer, which can be inconvenient for the end users. In addition, the access information for Web applications on MFPs can change, for example, if an administrator changes the configuration of an MFP. In these situations, users must obtain updated access information for the Web applications hosted on an MFP.

SUMMARY

An approach for managing Web applications on multi-function peripheral devices includes a multi-function peripheral configured with a Web application, and encoded data generator and a notification manager. The encoded data generator is configured to generate encoded access data for the Web application, wherein the encoded access data is generated based upon access data for accessing the Web application over a network. The notification manager is configured to cause the encoded access data to be made available to an end user.

BRIEF DESCRIPTION OF THE DRAWINGS

In the drawings:

FIG. 3 is an example graphical user screen displayed on the user interface of an MFP.

FIG. 4 is a block diagram of an application data table that contains application data maintained by an MFP.

FIG. 5 depicts an example graphical user interface screen displayed on a user interface of an MFP.

FIG. 7A depicts an example MFP network configuration screen.

FIG. 7B depicts an example Web application access data notification screen.

FIG. 8 is a message ladder diagram that depicts example message exchanges during the installation of a Web application on an MFP.

FIG. 9 is a message ladder diagram that depicts example message exchanges during the launching of a Web application on an MFP.

FIG. 10 is a message ladder diagram that depicts example message exchanges during the launching, from an external device, of a Web application on an MFP.

FIG. 11 is a message ladder diagram that depicts example message exchanges during the launching of a Web application on an MFP that invokes a scan process on the MFP.

FIG. 12 is a message ladder diagram that depicts example message exchanges during the launching of a Web application on an MFP that invokes a scan process on the MFP after successful authentication.

DETAILED DESCRIPTION

In the following description, for the purposes of explanation, numerous specific details are set forth in order to provide a thorough understanding of the embodiments. It will be apparent, however, that the embodiments may be practiced without these specific details. In other instances, well-known structures and devices are shown in block diagram form in order to avoid unnecessarily obscuring the embodiments.

I. OVERVIEW
II. SYSTEM ARCHITECTURE
III. MANAGING WEB APPLICATION ACCESS DATA
IV. WEB APPLICATION INSTALLATION
V. LAUNCHING A WEB APPLICATION FROM AN MFP
VI. LAUNCHING A WEB APPLICATION FROM AN EXTERNAL DEVICE
VII. PERFORMING MFP FUNCTIONS VIA WEB APPLICATIONS
VIII. RE-GENERATING ENCODED ACCESS DATA FOR WEB APPLICATIONS AND RE-NOTIFICATION
IX. IMPLEMENTATION MECHANISMS

I. Overview

An approach is provided for managing Web applications on MFPs. A MFP that has an installed Web application thereon includes an encoded data generator that is configured to generate encoded access data for the Web application. The encoded access data is generated based upon access data that specifies data for accessing the Web application over a network. Example forms of encoded access data include, without limitation, a bar code, a QR code, a signature, or other data. The generation of the encoded access data may be initiated in response to installation of the Web application on the MFP, in response to a change in configuration of the MFP or the Web application, or in response to the satisfaction of other criteria as described in more detail hereinafter. Encoded access data may also be re-generated, for example, in response to a change to the access data for a Web application, a change to the configuration of an MFP, or in response to satisfaction of other criteria. The encoded access data for the Web application may be made available to users using several different approaches, depending upon a particular implementation. For example, encoded access data may be displayed on the MFP or printed by the MFP on a printed medium, such as paper, a label, etc. This allows a user to acquire the encoded access data using a data capture device, for example, using a mobile device, telephony device, tablet computer, etc., that is equipped with a scanner or camera. Alternatively, the encoded access data may be transmitted to a client device of a user. This approach provides user friendly access to access data for Web applications on MFPs.

II. System Architecture

Figure 1:
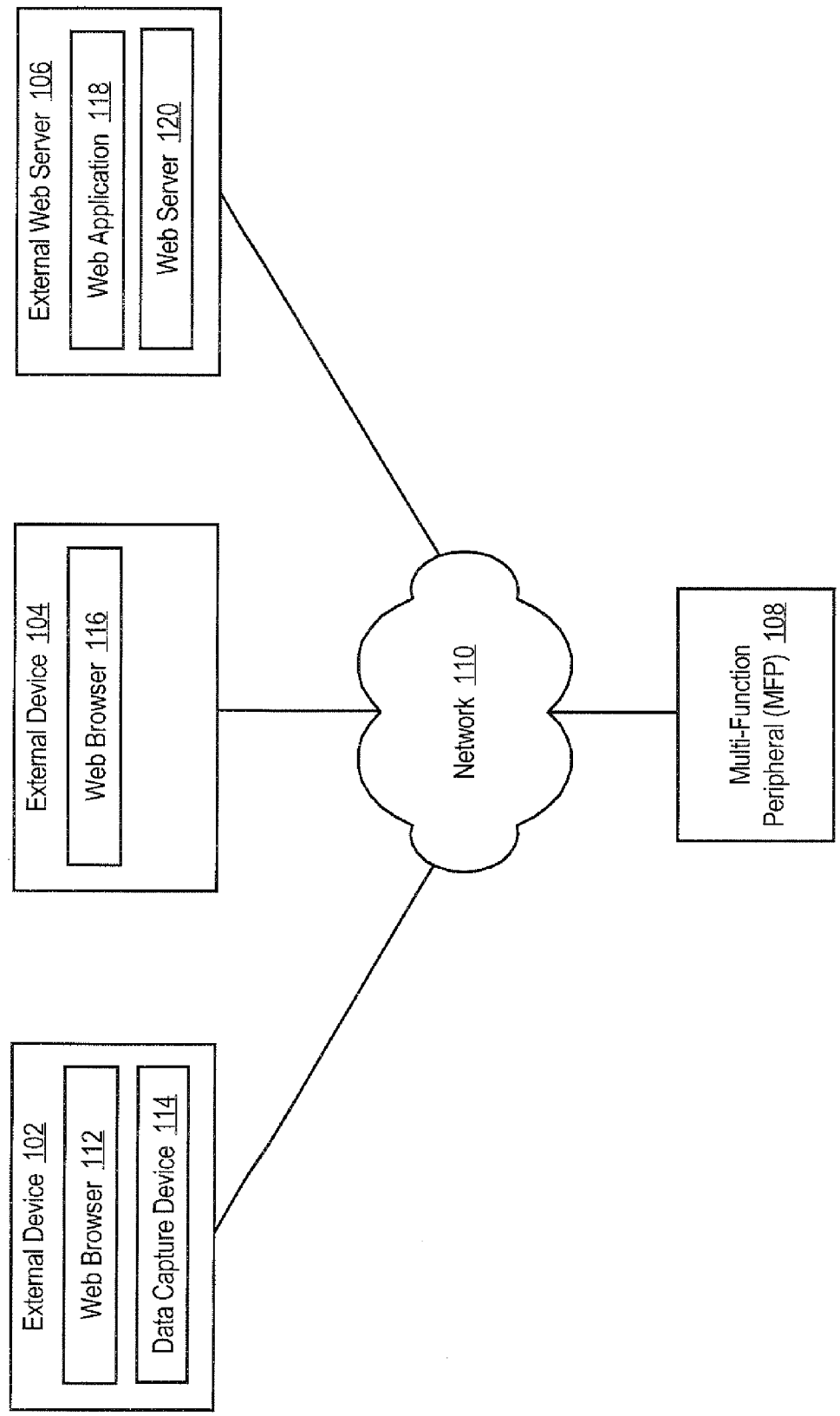
FIG. 1 is a block diagram that depicts an arrangement for managing Web applications on MFPs.

FIG. 1 is a block diagram that depicts an arrangement 100 for managing Web applications on MFPs. Arrangement 100 includes external devices 102, 104, an external Web server 106 and an MFP 108, communicatively coupled via a network 110. Network 110 may be any number and type of networks including, without limitation, one or more wired or wireless networks, for example, one or more local area networks (LANs), wide area networks (WANs) or other networks, and the Internet. Communications between the elements depicted in FIG. 1 may be made using secure communications and the elements depicted in FIG. 1 may also have direct communications links. Arrangement 100 may include additional elements, depending upon a particular implementation, that are not depicted in FIG. 1 for purposes of explanation.

External devices 102, 104 may be any type of external device, depending upon a particular implementation. Example external devices include, without limitation, tablet computing devices, laptop computers, personal digital assistants (PDAs), telephony devices and other mobile devices. External device 102 includes a Web browser 112 and a data capture device 114. Web browser 112 may be any type of Web browser that may vary depending upon a particular implementation. Data capture device 114 is a device that is capable of capturing encoded data. Examples of data capture device 114 include, without limitation, a data scanner, such as a bar code reader, QR code reader, etc., and a camera. External device 104 includes a Web browser 116. External Web Server 106 includes a Web application 118 and a Web server 120. External devices 102, 104 and external Web server 106 may include other elements, for example one or more processors, volatile and non-volatile storage, interfaces, etc., that are not depicted in FIG. 1 for purposes of explanation. MFP 108 may be any type of MFP, depending upon a particular implementation.

Figure 2:
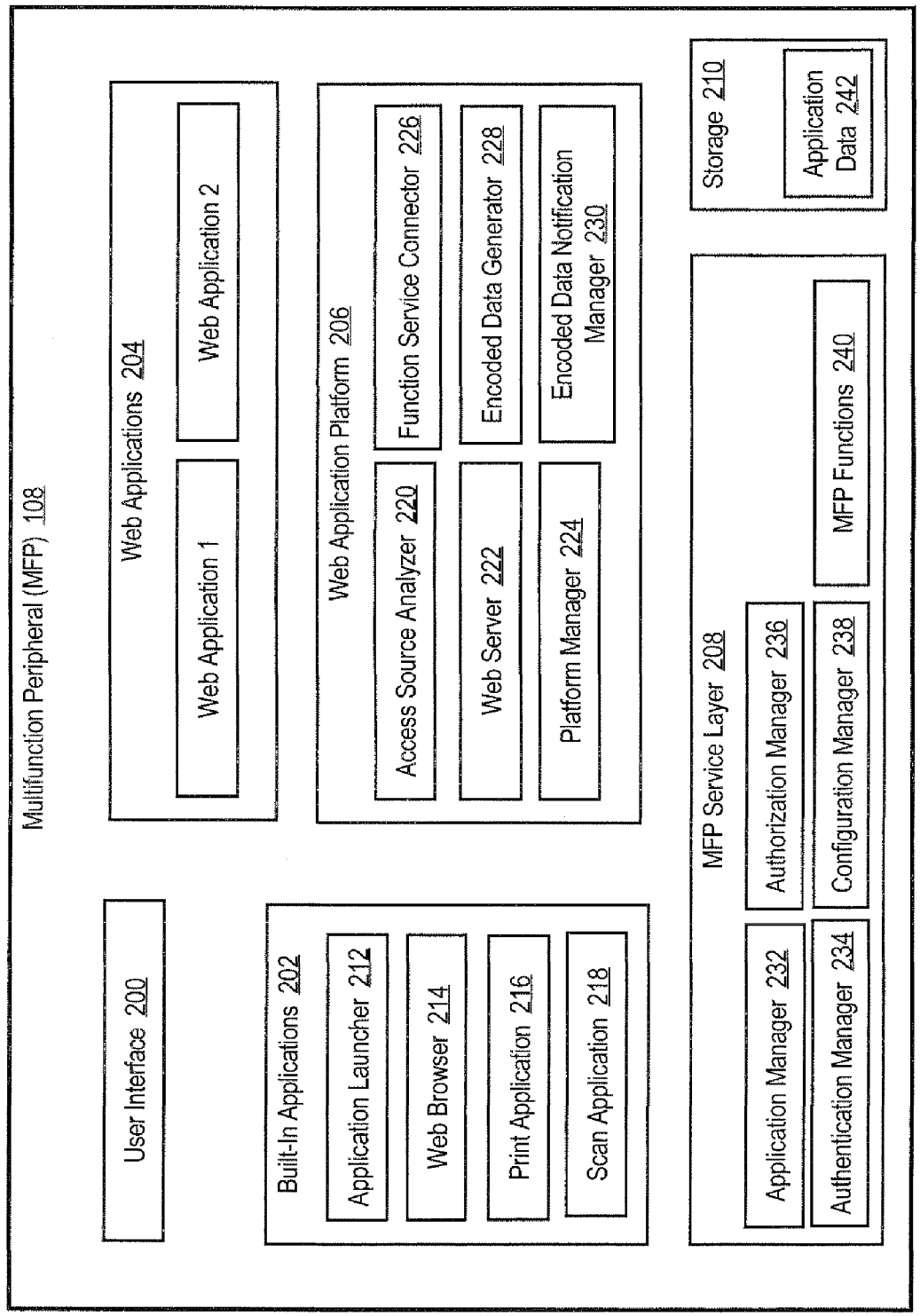
FIG. 2 depicts an example implementation of an MFP.

FIG. 2 depicts an example implementation of an MFP. In this example implementation, MFP 108 includes a user interface 200, built-in applications 202, Web applications 204, Web application platform 206, MFP service layer 208 and storage 210. MFP 108 may include other elements, such as one or more processors, volatile and non-volatile storage, interfaces, other processes, etc., that are not depicted in FIG. 2 for purposes of explanation.

Built-in applications 202 generally are applications that are provided by a manufacturer or that are configured by an administrator. In this example, built-in applications 202 include an application launcher 212, a Web browser 214, a print application 216 and a scan application 218. Application launcher 212 and Web browser 214 are processes that participate in invoking applications on MFP 108, as described in more detail hereinafter. Web applications 204 include Web Application 1 and Web Application 2. These Web applications may perform a wide variety of functions that may vary depending upon a particular implementation. Example functions performed by Web Application 1 and Web Application 2 include, without limitation, cloud computing functions such as scan-to-a cloud service or archive, mobile printing, MFP functions, etc. Embodiments are described herein in the context of two Web applications for purposes of explanation, but any number and type of Web applications may be hosted on MFP 108. Web application platform 206 supports the execution of Web applications on MFP 108 and includes an access source analyzer 220, a Web server 222, a platform manager 224, a function service connector 226, an encoded data generator 228 and an encoded data notification manager 230. Web server 222 may be implemented as a stand-alone Web server, or as part of a Web application server, depending upon a particular implementation. For purposes of explanation, Web server 222 is depicted in the figures and described herein in the context of a stand-alone Web server. The elements are described in more detail hereinafter. MFP service layer 208 generally supports the execution of services on MFP 108 and includes an application manager 232, an authentication manager 234, an authorization manager 236, a configuration manager 238 and MFP functions 240.

User interface 200 may be any type of user interface that may vary depending upon a particular implementation and embodiments described herein are not limited to any particular type of user interface. For example, user interface 200 may include a display screen or touch screen, a keyboard and/or keypad, and one or more control buttons. The display screen may display a graphical user interface generated by MFP 108. FIG. 3 is an example graphical user screen displayed on user interface 200. In this example, the graphical user interface screen includes graphical user interface objects or icons that correspond to four applications available on MFP 108, namely, Scanner, Printer, Web Application 1 and Web Application 2. Selection of a user interface object causes the corresponding application to be invoked.

FIG. 4 is a block diagram of an application data table 400 that contains application data maintained by MFP 108, for example, as application data 242 on storage 210. Application data table 400 includes data for the four applications depicted in FIG. 3. The data includes an application name, an application type and access data. The application name may be any data that identifies the corresponding application. The application type specifies the type of application, such as a built-in application or a browser-based application. The access data stores information uses to access the corresponding application, which is not applicable to the built-in applications. For the browser-based applications, the access data may store a URL that includes, for example, an address, port number, application name, etc., for accessing an application. The access data may be provided to users in various manners, depending upon a particular implementation. For example, the access data may be displayed on the user interface 200 of MFP 108 or as described in more detail hereinafter, encoded and displayed on the user interface 200 of MFP 108 or printed by MFP 108 to allow a user to acquire the encoded access data using a data capture device. The access data may also be encoded and transmitted to a client device of a user.

III. Managing Web Application Access Data

FIG. 5 depicts an example graphical user interface screen 500 displayed on user interface 200. Screen 500 displays a set of control buttons 502 that correspond to a set of applications available on MFP 108. The "Scan" and "Print" applications are built-in applications, while "Web Application 1" and "Web Application 2" are Web applications. In the example depicted in FIG. 5, "Web Application 1" has been selected by a user, for example, by touching a touch screen, using a stylus, etc. Screen 500 displays application information 504 for the selected application. In the present example, the application information 504 includes the application name, application type, e.g., built-in or browser-based, other information and access data. In this example, the access data specifies an address, including a port number, for accessing Web Application 1 using a Web browser. A user may enter the address into a Web browser on a client device to access Web Application 1. Application information 504 also displays the access data in encoded form, for example, as a QR code as depicted in FIG. 5. This allows a user to use a client device, such as a smart phone, tablet computer, PDA, or other mobile device that is equipped with a data capture device, to scan the QR code to obtain the access data for Web Application 1. This eliminates the need for the user to manually enter the access data into a Web browser on a client device. Application information 504 also includes controls for performing other actions with respect to the access data. In the present example, a Print QR Code 506 control is provided that when selected, causes the MFP to print the QR code on a printed medium, for example, on paper, a label, etc. Also provided is a Transmit Access Data 508 control that when selected, causes the access data to be transmitted over a network to a recipient device. For example, in response to selecting the Transmit Access Data 508 control, the user may be queried for a location, e.g., the user's client device, to which the access data is to be transmitted.

Figure 6:
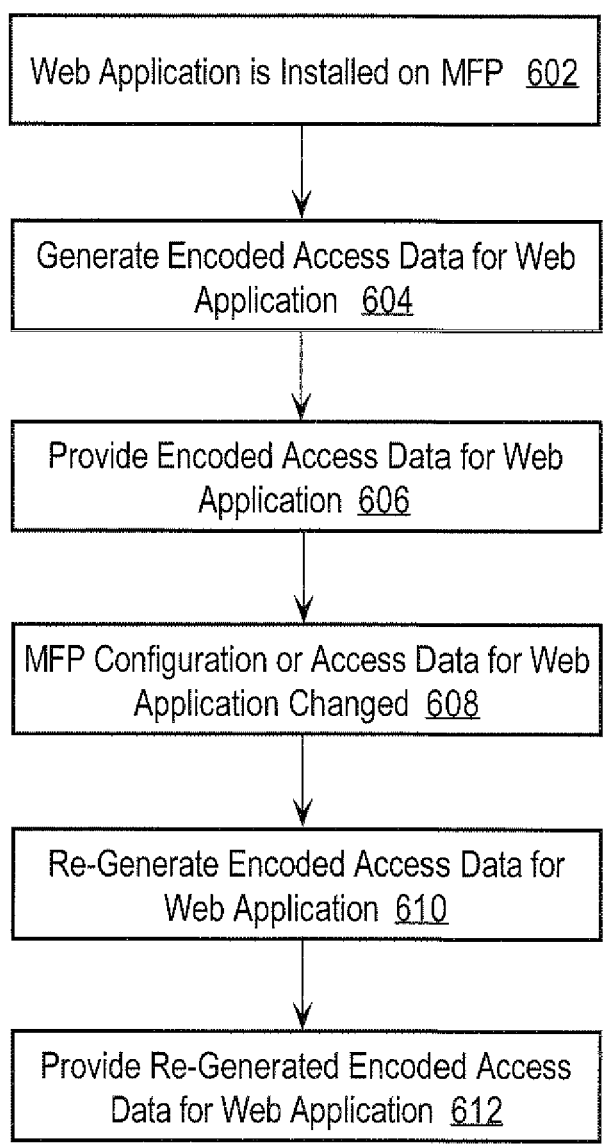
FIG. 6 depicts a flow diagram for managing Web applications on MFPs.

FIG. 6 depicts a flow diagram 600 for managing Web applications on MFPs according to an embodiment. In step 602, a Web application is installed on an MFP. For example, an administrator may use administrative tools made available through the application manager 232 to install a Web application on MFP 108. The installation of the Web application typically involves specifying access data for the Web application, for example, in the form of a URL that can be used by Web browsers, located either internal to the MFP 108 or external to the MFP 108 on client devices, to access the Web application. In step 604, encoded access data is generated for the Web application. For example, encoded data generator 228 may generate bar code data, QR code data, signature or other data based upon the access data for the Web application. The encoded access data may be stored on the MFP. For example, the encoded access data for the Web application may be stored in storage 210, as part of or separate from application data 242. The encoded access data may be generated in response to installation of the Web application on MFP 108, or in response to satisfaction of other criteria. For example, after the Web application has been installed on MFP 108, the encoded access data may be generated in response to a request from an administrator. The encoded access data may also be generated in response to expiration of a specified time.

In step 606, the encoded access data for the Web application is provided. This may be accomplished in several different ways, depending upon a particular implementation. For example, the encoded access data for the Web application may be displayed on the user interface of the MFP, as depicted in FIG. 5. As another example, the encoded access data may be printed on a physical medium by the MFP. As yet another example, the encoded access data may be transmitted by the MFP to another device, for example a client device of a user. The encoded access data may be provided in combinations of the foregoing, for example, displayed on the MFP, printed by the MFP, transmitted to another device, or any combination thereof. The encoded access data for the Web application may be displayed on the MFP, printed by the MFP or transmitted to another device with the access data, i.e., the un-encoded access data. For example, selecting the "Print QR Code 502" option depicted in FIG. 5 may cause both the access data and the encoded access data in the form of a QR code to be printed on a physical medium by MFP 108.

In step 608, the MFP configuration or access data for the Web application is changed. For example, an administrator may change one or more network configuration parameters for the MFP, e.g., by changing the IP address or port information for the MFP. As another example, an administrator may change the access information for the Web application, e.g., by changing the URL for the Web application. FIG. 7A depicts an example MFP network configuration screen 700. MFP network configuration screen 700 may be generated, for example, by configuration manager 238 and accessed by an administrator. MFP network configuration screen 700 allows a user, such as an administrator, to change, via a set of controls 704, network settings values 702, such as an IP address, http port or https port. Embodiments are not limited to the example network settings values depicted in FIG. 7A and any type and number of network settings may be included. Changes to the network settings values may be confirmed via a confirmation button 706 or canceled via a cancel button 708.

Figure 7C:
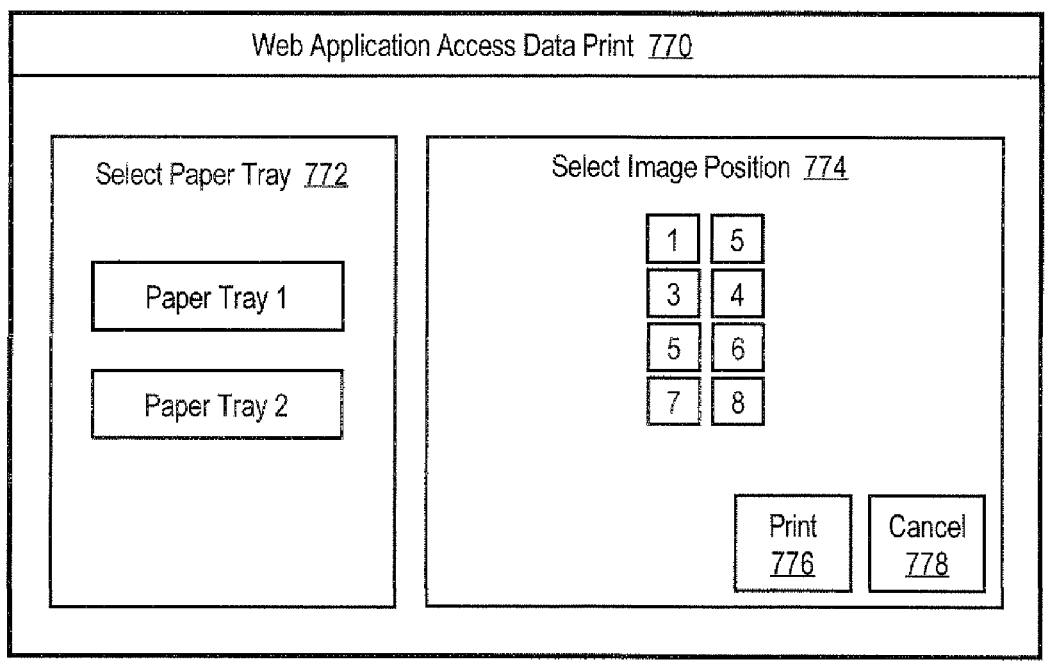
FIG. 7C depicts an example Web Application Access Data Print screen that allows a user to print encoded access data for a Web application.

In step 610, the encoded access data is re-generated for the Web application. For example, the encoded data generator 228 may generate new bar code data, QR code data, signature or other new data in response to the change to the network parameters for the MFP or the access data for the Web application. In step 612, the re-generated encoded access data for the Web application is provided. For example, the re-generated encoded access data for the Web application may be displayed on the MFP, printed by the MFP, transmitted to another device, or any combination thereof. The re-generation and providing of encoded access data may be performed automatically, for example, in response to a change to the access data for a Web application or in response to a change to the network configuration of an MFP. Alternatively, re-generation of encoded access data and/or the providing of re-generated encoded access data may be performed in response to satisfaction of other re-generation criteria. FIG. 7B depicts an example Web application access data notification screen 750 that may be generated, for example, by configuration manager 238 and accessed by an administrator. In this example, a user may select a Web application from a Select Web Application screen 752 and then select one or more notification methods from a Select Notification Methods screen 754. In this example, a user may select to have the encoded access data printed by the MFP, for example, in the form of a QR code, or select to send the access data to one or more recipients via email. FIG. 7C depicts an example Web Application Access Data Print screen 770 that allows a user to print encoded access data for a Web application. In this example, the screen 770 includes an option to Select Paper Tray 772, e.g., Paper Tray 1 or Paper Tray 2, and an option to Select Image Position 774 on a printed medium, such as a paper or label sheet. A Print object 776 causes the encoded access data to be printed and a Cancel option 778 cancels the print process.

Sending the access data to one or more recipients via email may include sending the access data, for example in the form of a URL, the encoded access data, or both the access data (un-encoded) and the encoded access data. Screen 750 also includes an option 756 to change the email recipients. A user may also select to have the encoded access data both printed by the MFP and sent to one or more email recipients. Once the user has selected the notification methods, then selection of the OK object 756 causes the notifications to be made. A cancellation object 758 cancels the Web application access data notification process.

Although in the example depicted in FIG. 6, the encoded access data is re-generated in response to a change to the access data for a Web application or the network configuration of an MFP, embodiments are not limited to these example and encoded access data may be re-generated in response to satisfaction of other re-generation criteria. For example, the re-generation and providing of encoded access data may be performed automatically on a periodic basis by an MFP, or it may be performed on-demand, e.g., in response to a request by an administrator or a component with the MFP.

IV. Web Application Installation

FIG. 8 is a message ladder diagram 800 that depicts example message exchanges during the installation of a Web application on an MFP, according to an embodiment. For purposes of explanation, this example is described in the context of an administrator (Admin) installing a Web application named "Web Application (App) 1." In step 802, an administrator issues a request to the platform manager 224 to access a Web application installation tool to install the new Web application "Web Application 1." In step 804, the platform manager 224 issues a response to the administrator. The response may include, for example, one or more Web pages that comprise a graphical user interface for installing Web applications on MFP 108. In step 806, the administrator issues a request to the platform manager 224 to install Web App 1. In step 808, the platform manager 224 provides a response to the administrator, for example, to confirm the request from administrator. In step 810, the platform manager 224 gets Web App 1 and in step 812, the platform manager 224 receives a response. The response may include information about Web App 1, for example, configuration data for Web App 1.

In step 814, the platform manager 224 parses the Web app configuration data for Web App 1 and in step 816, issues a request to the configuration manager 238 for MFP configuration data. In step 818, the configuration manager 238 provides MFP configuration data to the platform manger 224. In step 820, the platform manager 224 issues a request to Web server 222 to deploy Web App 1 and in step 822, Web server 222 issues a response to platform manager 224 confirming the request.

In step 824, the platform manager 224 issues a request to the application manager 232 to register Web App 1. The request may include access data for Web App 1, for example, a URL for accessing Web App 1. In step 826, application manager 232 sends a response to platform manager 224 confirming the request. In step 828, platform manager 224 issues a notification request to the encoded data notification manager 230. The notification request may specify, for example, a type of notification, such as printing encoded data or email notification, and may specify one or more recipients for email notification. In step 830, the encoded data notification manager 230 issues a request to the encoded data generator 228 to create encoded access data for the new Web application Web App 1. In step 832, the encoded data generator 228 issues a response to the encoded data notification manager 230. The response may also be provided to the platform manager 224 and also the Admin via Web Application 1 to confirm to the Admin that Web Application 1 was successfully installed. In step 834, the encoded data notification manager 230 issues a request to one or more of the MFP functions 240 to complete the notification process, for example, by printing encoded access data, such as a QR code, for the new Web application Web App 1, or by sending an email notification to one or more recipients. The email notification may include the access data, the encoded access data, such as a QR code, or both the access data and the encoded access data for the new Web application Web App 1.

V. Launching a Web Application from an MFP

FIG. 9 is a message ladder diagram 900 that depicts example message exchanges during the launching of a Web application on an MFP, according to an embodiment. For purposes of explanation, this example is described in the context of user (User) of a MFP launching a Web application on an MFP configured in accordance with an embodiment. In step 902, a user accesses application launcher 212 on the MFP, for example, by selecting a graphical user interface object, such as an icon, via the user interface 200 of MFP 108. In step 904, application launcher 212 provides a response that indicates the available Web applications on MFP 108. For example, application launcher 212 may cause of list of available Web applications to be displayed on user interface 200. In step 906, the user selects Web Application (App) 1, for example, by selecting a graphical user interface object, such as an icon, that corresponds to Web App 1. In response to the user's selection, in step 908, application launcher 212 sends to application manager 232 a request to launch Web App 1. In step 910, application manager 232 issues a request to launch Web browser 214 and in step 912, Web browser 214 requests HTML content from Web server 222. In step 914, Web server 222 requests HTML content, for example in the form of one or more Web pages, from Web Application 1. In step 916, Web Application 1 provides HTML content to Web server 222. In step 918, Web server 222 provides the HTML content to Web browser 214 which then in step 920 provides the HTML content to the user, for example, by displaying one or more Web pages on the user interface 200 of MFP 108. Note that in this example, and other examples described herein, the Web server 222 acts as an intermediary between Web browser 214 and the Web applications 204. This may be done, for example, when Web browser 214 is making http type requests to the Web applications 204. This is not required, however, and Web browser 214 may make requests directly to Web applications 204, for example, file requests.

VI. Launching a Web Application from an External Device

FIG. 10 is a message ladder diagram 1000 that depicts example message exchanges during the launching, from an external device, of a Web application on an MFP, according to an embodiment. For purposes of explanation, this example is described in the context of user (User) of external device 102 launching Web application 1 on MFP 108. In this example, the access data for Web Application 1 comprises a URL and encoded access data for Web Application 1 is displayed on the user interface 200 of MFP 108 in the form of a QR code for explanation purposes only and embodiments are not limited to encoded data for Web applications in the form of QR codes.

In step 1002, a user interacts with external device 102 and requests to scan the QR code for Web application displayed on the user interface 200 of MFP 108. This may include, for example, the user selecting a graphical user interface object, such as an icon, that corresponds to a data capture function of external device 102. In step 1004, the data capture device 114 acquires the QR code image displayed on the user interface 200 of MFP 108. This may include, for example, data capture device 114 scanning the QR code or acquiring an image of the QR code. In step 1006, the data capture device 114 receives the QR code image data and in step 1008 the data capture device 114 processes the QR code image data to recover the access data for Web application 1. In the present example, the data capture device 114 recovers, from the encoded data, a URL for accessing Web Application 1.

In step 1010, data capture device 114 opens the URL for Web Application 1 using Web browser 214. In step 1012, Web browser 214 requests HTML content from Web server 222. The requested HTML content may include, for example, one or more Web pages. In step 1014, Web server 222 requests HTML context from Web Application 1. In step 1016, Web Application 1 provides the requested HTML content to Web server 222. In step 1018, Web server 222 provides the HTML content to Web browser 112 and in step 1020, Web browser 112 provides the HTML content to the user, for example, by displaying one or more Web pages. The embodiment depicted in FIG. 10 and described herein demonstrates the ability for a user to use an external device to access a Web application on an MFP without the user having to be aware of or manually enter into a Web browser access data for the Web application. Instead, the user is able to scan the encoded access data displayed on the user interface 200 of the MFP 108 using the data capture device 114 of the external device 102 to access the Web application.

VII. Performing MFP Functions Via Web Applications

Web applications executing on MFPs may perform a wide variety of functions that may vary depending upon a particular implementation and Web applications may invoke native functions of MFPs, such as scanning, printing, faxing, copying, etc. FIG. 11 is a message ladder diagram 1100 that depicts example message exchanges during the launching of a Web application on an MFP that invokes a scan process on the MFP.

In step 1102, a user initiates a scan process on an MFP. For example, the user may select one or more controls, such as buttons, on user interface 200 of MFP 108. As another example, the user may select one or more graphical user interface objects displayed on user interface 200. In response to this selection, the MFP launches the Web application that invokes the scan process. In step 1104, Web Application 1 sends a command to function service connector 226 to initiate a scan operation. The function service connector 226 sends a command to a scan function in MFP functions 240 to initiate a scan operation. In step 1108, the scan is performed and in step 1110, the scan function provides a scan result, such as scan data, to the function service connector 226. In step 1112, the function service connector 226 provides the scan result to Web Application 1. Web Application 1 may cause the scan data to be sent to the user, for example, using the user information obtained by the authentication manager 234. For example, Web Application 1 may cause the scan data to be transmitted to the user via email. In step 1114, Web Application 1 generates one or more Web pages. In step 1116, the Web pages are displayed to the user, for example, by rendering the Web pages on the user interface 200 of MFP 108. The one or more Web pages may display a confirmation to the user that the scan operation was completed. In one embodiment, the one or more Web pages may also display the scan result, for example, the scanned documents, a portion of the scanned documents, or a representation of the scanned documents, such as a thumbnail. As depicted in this example, function service connector 226 allows Web applications 204 to access the MFP service layer 208. In one embodiment, function service connector 226 includes an Application Program Interface (API) that is used by the Web applications 204 to access services provided by the MFP service layer 208.

MFPs may be configured to allow local or remote access and they may also support user authentication, i.e., require successful user authentication before a user is allowed access. FIG. 12 is a message ladder diagram 1200 that depicts example message exchanges during the launching of a Web application on an MFP that invokes a scan process on the MFP after successful authentication.

In step 1202, a user initiates a scan process on an MFP. For example, the user may select one or more controls, such as buttons, on user interface 200 of MFP 108. As another example, the user may select one or more graphical user interface objects displayed on user interface 200. In response to this selection, the MFP launches the Web application that invokes the scan process. In step 1204, Web Application 1 sends a command to function service connector 226 to initiate a scan operation. The function service connector 226 sends to the access source analyzer 220, a request for analyze the source device, i.e., the MFP 108. In step 1206, the access source analyzer 220 requests the current MFP configuration from MFP configuration manager 238. In step 1208, the MFP configuration manager 238 provides MFP configuration data to the access source analyzer 220. In step 1210, the access source analyzer 220 analyzes the MFP configuration data received from the MFP configuration manager 238 in step 1208. In step 1212, the access source analyzer 220 provides a result to the function service connector 226. In step 1214, the function service connector 226 sends a command to a scan function in MFP functions 240 to initiate a scan operation. In step 1216, the MFP functions 240, e.g., a scan function, sends a request to the authentication manager 234 for user information. This may include, for example, obtaining login information for the user in the form of a user ID and/or password. In step 1218 the authentication manager 234 provides the user information to MFP functions 240. In step 1220, the scan is performed and in step 1222, the scan function provides a scan result, such as scan data, to the function service connector 226. In step 1224, the function service connector 226 provides the scan result to Web Application 1. Web Application 1 may cause the scan data to be sent to the user, for example, using the user information obtained by the authentication manager 234. For example, Web Application 1 may cause the scan data to be transmitted to the user via email. In step 1226, Web Application 1 generates one or more Web pages. In step 1228, the Web pages are provided to the user, for example, by rendering the Web pages on the user interface 200 of MFP 108. The one or more Web pages may display a confirmation to the user that the scan operation was completed. In one embodiment, the one or more Web pages may also display the scan result, for example, the scanned documents, a portion of the scanned documents, or a representation of the scanned documents, such as a thumbnail. In this example, it is assumed that the user is a local user who is known to the MFP 108 and for which the MFP 108 has information available to authentication manger 234, such as login information. In situations where a non-local user, e.g., a guest user, wishes to perform a scan operation on MFP 108 using a Web application, prior to Step 1202, the user may be queried for user information, such as login information. In this situation, Steps 1216 and 1218 may not be performed.

VIII. Re-Generating Encoded Access Data for Web Applications and Re-Notification The re-generation and re-notification of encoded access data for Web applications may be performed automatically, for example, in response to a change to the access data for a Web application or in response to a change to the network configuration of an MFP. Alternatively, re-generation of encoded access data and/or the re-notification of re-generated encoded access data may be performed in response to satisfaction of other re-generation criteria. For example, the re-generation and providing of encoded access data may be performed automatically on a periodic basis by an MFP, or it may be performed on-demand, e.g., in response to a request by an administrator.

Figure 13:
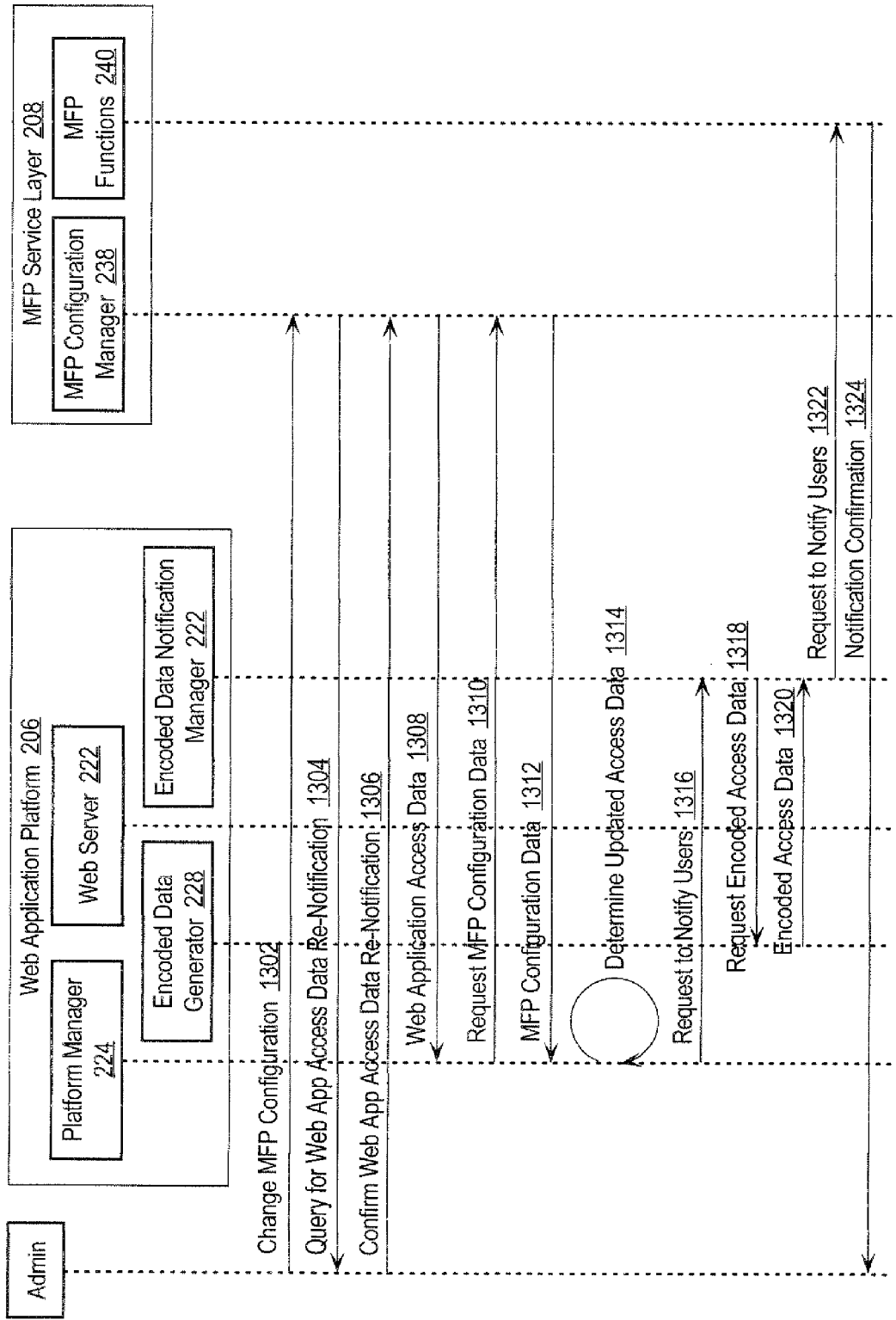
FIG. 13 is a message ladder diagram that depicts example message exchanges during the re-generation and re-notification of Web application encoded access data.

FIG. 13 is a message ladder diagram 1300 that depicts example message exchanges during the re-generation and re-notification of Web application encoded access data.

In step 1302, an administrative user (Admin) makes a request to the MFP configuration manager 238 to change the MFP configuration. For example, the administrator may access, either locally at the MFP or remotely using a client device, an administrator user interface provided by the MFP configuration manager 238 and change one or more MFP network configuration parameter values, as previously described herein with respect to FIG. 7A. In step 1304, the MFP configuration manager 238 queries the administrator for Web application access data re-notification, i.e., whether users should be re-notified of the access data for one or more Web applications. In step 1306, the administrator confirms that re-notification should be performed. For example, the administrator may be presented with a graphical user interface similar to FIG. 7B and confirm access data re-notification for one or more Web applications.

In step 1308, the MFP configuration manager 238 provides Web application access data to platform manager 224. In this example, for purposes of explanation, it is presumed that the Web application access data includes access data for Web application 1. In step 1310, platform manager 224 requests MFP configuration data from MFP configuration manager 238. In step 1312, the MFP configuration manager 238 provides MFP configuration data to platform manager 224. The MFP configuration data may include, for example, MFP network configuration parameter values.

In step 1314, platform manager 224 generates updated access data for the Web application. In the present example, platform manager 224 generates updated access data for Web Application 1. In step 1316, platform manager 224 sends, to the encoded data notification manager 230, a request to notify users of the updated access data. In step 1318, encoded data notification manager 230 requests encoded access data from encoded data generator 228. In the present example, the request may include the access data for Web Application 1, such as the URL for Web Application 1. The encoded data generator 228 generates encoded access data for Web Application 1, for example, in the form of a QR code and in step 1320, provides the encoded access data to the encoded data notification manager 230. In step 1322, the encoded data notification manager 230 sends to MFP functions 240, a request to notify users of the updated access data for Web Application 1. The request may specify one or more modes of notification. For example, the request may specify that notification is to be performed by the MFP printing the encoded access data, such as a QR code, on a printed medium, such as a page of paper. As another example, the request may specify that notification is to be performed by the MFP sending an email to a client device of a user, where the email contains the encoded access data, such as a QR code. This allows the user to use a client device to acquire the encoded access data and recover the access data for the Web application. The request may directed to a particular MFP function within MFP functions 240. For example, if the request is to print encoded access data on a physical medium, then the request may be directed to a print process within MFP functions 240. In step 1324, the MFP functions 240 provide a notification confirmation to the administrator. This may include, for example, displaying a notification on the user interface of the MFP, sending a confirmation message to a client device of the administrator, or any combination thereof.

IX. Implementation Mechanisms

Although embodiments have been described herein in the context of managing Web applications on MFPs, the invention is not limited to this context and embodiments may be implemented on other types of devices. For example, the embodiments described herein are applicable to projection devices that may be configured to display encoded access data on a screen or surface. Projection devices may also be configured to display encoded access data on a user interface of the projection devices, such as a display screen. This allows mobile devices to acquire the encoded data displayed on the screen, surface or display screen of the projector for one or more Web applications executing on the projector. For example, a user may use a mobile device to scan a QR code of a projector displayed on a screen or surface. As another example, embodiments are also applicable to managing Web applications on cameras. In this example, a camera may be configured to display, on the display screen of the camera, encoded access data for a Web application installed on the camera.

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 14:
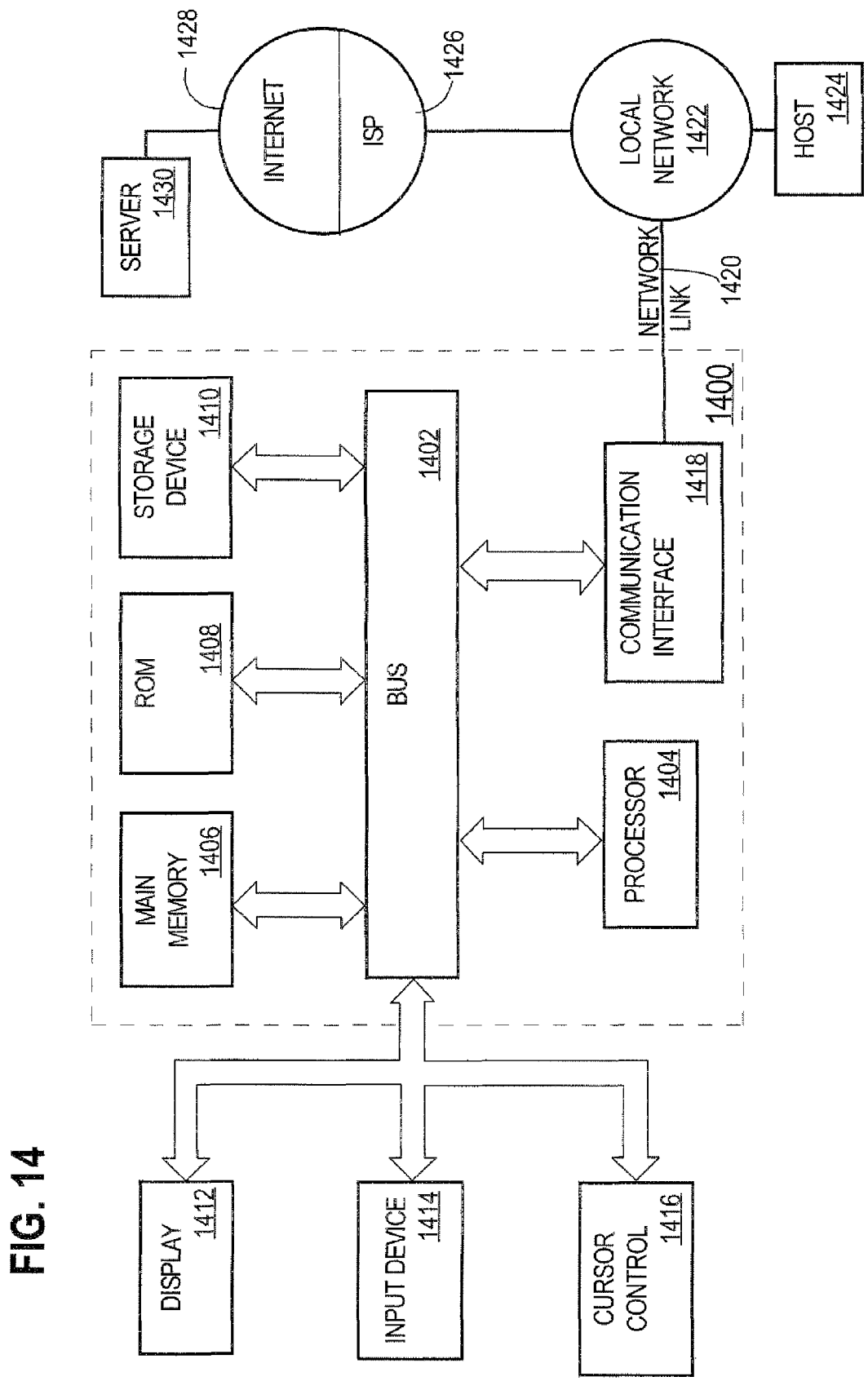
FIG. 14 is a block diagram that depicts a computer system upon which an embodiment may be implemented.

FIG. 14 is a block diagram that depicts an example computer system 1400 upon which embodiments may be implemented. Computer system 1400 includes a bus 1402 or other communication mechanism for communicating information, and a processor 1404 coupled with bus 1402 for processing information. Computer system 1400 also includes a main memory 1406, such as a random access memory (RAM) or other dynamic storage device, coupled to bus 1402 for storing information and instructions to be executed by processor 1404. Main memory 1406 also may be used for storing temporary variables or other intermediate information during execution of instructions to be executed by processor 1404. Computer system 1400 further includes a read only memory (ROM) 1408 or other static storage device coupled to bus 1402 for storing static information and instructions for processor 1404. A storage device 1410, such as a magnetic disk or optical disk, is provided and coupled to bus 1402 for storing information and instructions.

Computer system 1400 may be coupled via bus 1402 to a display 1412, such as a cathode ray tube (CRT), for displaying information to a computer user. Although bus 1402 is illustrated as a single bus, bus 1402 may comprise one or more buses. For example, bus 1402 may include without limitation a control bus by which processor 1404 controls other devices within computer system 1400, an address bus by which processor 1404 specifies memory locations of instructions for execution, or any other type of bus for transferring data or signals between components of computer system 1400.

An input device 1414, including alphanumeric and other keys, is coupled to bus 1402 for communicating information and command selections to processor 1404. Another type of user input device is cursor control 1416, such as a mouse, a trackball, or cursor direction keys for communicating direction information and command selections to processor 1404 and for controlling cursor movement on display 1412. This input device typically has two degrees of freedom in two axes, a first axis (e.g., x) and a second axis (e.g., y), that allows the device to specify positions in a plane.

Computer system 1400 may implement the techniques described herein using customized hard-wired logic, one or more ASICs or FPGAs, firmware and/or program logic or computer software which, in combination with the computer system, causes or programs computer system 1400 to be a special-purpose machine. According to one embodiment, those techniques are performed by computer system 1400 in response to processor 1404 executing one or more sequences of one or more instructions contained in main memory 1406. Such instructions may be read into main memory 1406 from another computer-readable medium, such as storage device 1410. Execution of the sequences of instructions contained in main memory 1406 causes processor 1404 to perform the process steps described herein. In alternative embodiments, hard-wired circuitry may be used in place of or in combination with software instructions to implement the embodiments. Thus, embodiments are not limited to any specific combination of hardware circuitry and software.

The term "computer-readable medium" as used herein refers to any medium that participates in providing data that causes a computer to operate in a specific manner. In an embodiment implemented using computer system 1400, various computer-readable media are involved, for example, in providing instructions to processor 1404 for execution. Such a medium may take many forms, including but not limited to, non-volatile media and volatile media. Non-volatile media includes, for example, optical or magnetic disks, such as storage device 1410. Volatile media includes dynamic memory, such as main memory 1406. Common forms of computer-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or memory cartridge, or any other medium from which a computer can read.

Various forms of computer-readable media may be involved in carrying one or more sequences of one or more instructions to processor 1404 for execution. For example, the instructions may initially be carried on a magnetic disk of a remote computer. The remote computer can load the instructions into its dynamic memory and send the instructions over a telephone line using a modem. A modem local to computer system 1400 can receive the data on the telephone line and use an infra-red transmitter to convert the data to an infra-red signal. An infra-red detector can receive the data carried in the infra-red signal and appropriate circuitry can place the data on bus 1402. Bus 1402 carries the data to main memory 1406, from which processor 1404 retrieves and executes the instructions. The instructions received by main memory 1406 may optionally be stored on storage device 1410 either before or after execution by processor 1404.

Computer system 1400 also includes a communication interface 1418 coupled to bus 1402. Communication interface 1418 provides a two-way data communication coupling to a network link 1420 that is connected to a local network 1422. For example, communication interface 1418 may be an integrated services digital network (ISDN) card or a modem to provide a data communication connection to a corresponding type of telephone line. As another example, communication interface 1418 may be a local area network (LAN) card to provide a data communication connection to a compatible LAN. Wireless links may also be implemented. In any such implementation, communication interface 1418 sends and receives electrical, electromagnetic or optical signals that carry digital data streams representing various types of information.

Network link 1420 typically provides data communication through one or more networks to other data devices. For example, network link 1420 may provide a connection through local network 1422 to a host computer 1424 or to data equipment operated by an Internet Service Provider (ISP) 1426. ISP 1426 in turn provides data communication services through the world wide packet data communication network now commonly referred to as the "Internet" 1428. Local network 1422 and Internet 1428 both use electrical, electromagnetic or optical signals that carry digital data streams.

Computer system 1400 can send messages and receive data, including program code, through the network(s), network link 1420 and communication interface 1418. In the Internet example, a server 1430 might transmit a requested code for an application program through Internet 1428, ISP 1426, local network 1422 and communication interface 1418. The received code may be executed by processor 1404 as it is received, and/or stored in storage device 1410, or other non-volatile storage for later execution.

In the foregoing specification, embodiments have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A multifunction peripheral device comprising:
   a Web application;
   a Web application platform configured to support execution of the Web application on the multifunction peripheral device;

a Web application manager configured to register the Web application on the multifunction peripheral device and generate access data that specifies how to access the Web application on the multifunction peripheral device via one or more networks from a device external to the multifunction peripheral device;

an encoded data generator that is configured to generate encoded access data for the Web application on the multifunction peripheral device, wherein the encoded access data is generated based upon the access data that specifies how to access the Web application on the multifunction peripheral device via one or more networks from the device external to the multifunction peripheral device; and a notification manager configured to cause the encoded access data to be made available to an end user.

2. The multi-function peripheral device of claim 1, wherein the encoded data generator is configured to generate the encoded access data for the Web application on the multifunction peripheral device in response to one or more of installation of the Web application on the multi-function peripheral device, a user request, or expiration of a specified time.

3. The multi-function peripheral device of claim 1, wherein the notification manager is configured to cause the encoded access data to be made available to an end user by one or more of causing the multifunction peripheral device to display the encoded access data, causing the multifunction peripheral device to print one or more pages that include the encoded access data or causing the encoded access data to be transmitted over a communications network to a client device of the end user.

4. The multi-function peripheral device of claim 3, wherein the notification manager is further configured to cause the access data to be displayed with the encoded access data, printed with the encoded access data or transmitted with the encoded access data over a communications network to a client device of the end user.

5. The multi-function peripheral device of claim 1, wherein the encoded access data is in a form that includes one or more of a QR code, a bar code, or a signature.

6. The multi-function peripheral device of claim 1, wherein the access data indicates a URL of the Web application on the multifunction peripheral device.

7. One or more non-transitory computer-readable media storing instructions which, when processed by one or more processors, cause:
a Web application manager executing on a multi-function peripheral device to register a Web application executing on a Web application platform on the multi-function peripheral device and generate access data that specified how to access the Web application on the multi-function peripheral device via one or more networks from a device external to the multifunction peripheral device;

an encoded data generator executing on a multi-function peripheral to generate encoded access data for a Web application executing on a Web application platform on the multi-function peripheral device, wherein the encoded access data is generated based upon the access data that specifies how to access the Web application on the multifunction peripheral device via one or more networks from the device external to the multifunction peripheral device; and a notification manager on the multi-function peripheral to cause the encoded access data to be made available to an end user.

8. The one or more non-transitory computer-readable media of claim 7, further comprising additional instructions which, when processed by the one or more processors, cause the encoded data generator to generate the encoded access data for the Web application on the multifunction peripheral device in response to one or more of installation of the Web application on the multi-function peripheral device, a user request, or expiration of a specified time.

9. The one or more non-transitory computer-readable media of claim 7, further comprising additional instructions which, when processed by the one or more processors, cause the notification manager to cause the encoded access data to be made available to an end user by one or more of causing the multifunction peripheral device to display the encoded access data, causing the multifunction peripheral device to print one or more pages that include the encoded access data or causing the encoded access data to be transmitted over a communications network to a client device of the end user.

10. The one or more non-transitory computer-readable media of claim 9, further comprising additional instructions which, when processed by the one or more processors, cause the notification manager to cause the access data to be displayed with the encoded access data, printed with the encoded access data or transmitted with the encoded access data over a communications network to a client device of the end user.

11. The one or more computer-readable media of claim 7, wherein the encoded access data is in a form that includes one or more of a QR code, a bar code, or a signature.

12. The one or more non-transitory computer-readable media of claim 7, wherein the access data indicates a URL of the Web application on the multifunction peripheral device.

13. A computer-implemented method comprising:
a Web application manager executing on a multi-function peripheral device registering a Web application executing on a Web application platform on the multi-function peripheral device and generating access data that specifies how to access the Web application on the multi-function peripheral device via one or more networks from a device external to the multifunction peripheral device;

an encoded data generator executing on a multi-function peripheral device generating encoded access data for a Web application executing on a Web application platform on the multi-function peripheral device, wherein the encoded access data is generated based upon the access data that specifies how to access the Web application on the multifunction peripheral device via one or more networks from the device external to the multifunction peripheral device; and a notification manager on the multi-function peripheral device causing the encoded access data to be made available to an end user.

14. The computer-implemented method of claim 13, further comprising the encoded data generator generating the encoded access data for the Web application on the multi-function peripheral device in response to one or more of installation of the Web application on the multi-function peripheral device, a user request, or expiration of a specified time.

15. The computer-implemented method of claim 13, further comprising the notification manager causing the encoded access data to be made available to an end user by one or more of causing the multifunction peripheral device to display the encoded access data, causing the multifunction peripheral device to print one or more pages that include the encoded access data or causing the encoded access data to be transmitted over a communications network to a client device of the end user.

16. The computer-implemented method of claim 15, further comprising the notification manager causing the access data to be displayed with the encoded access data, printed with the encoded access data or transmitted with the encoded access data over a communications network to a client device of the end user.

17. The computer-implemented of claim 13, wherein the access data indicates a URL of the Web application on the multifunction peripheral device and the encoded access data is in a form that includes one or more of a QR code, a bar code, or a signature.

* * * * *